(12) United States Patent
Raval et al.

(10) Patent No.: US 8,994,279 B2
(45) Date of Patent: Mar. 31, 2015

(54) METHOD AND APPARATUS TO CONTROL A DC-DC CONVERTER

(71) Applicants: Pranav Raval, Nashua, NH (US);
Gregory Szczeszynski, Hollis, NH (US);
Bassem Alnahas, Manchester, NH (US);
Nai-Chi Lee, Nashua, NH (US)

(72) Inventors: Pranav Raval, Nashua, NH (US);
Gregory Szczeszynski, Hollis, NH (US);
Bassem Alnahas, Manchester, NH (US);
Nai-Chi Lee, Nashua, NH (US)

(73) Assignee: Allegro Microsystems, LLC, Worcester, MA (US)

( * ) Notice: Subject to any disclaimer, the term of this patent is extended or adjusted under 35 U.S.C. 154(b) by 136 days.

(21) Appl. No.: 13/752,904

(22) Filed: Jan. 29, 2013

(65) Prior Publication Data

US 2014/0210359 A1    Jul. 31, 2014

(51) Int. Cl.
| H05B 37/00 | (2006.01) |
| H05B 39/00 | (2006.01) |
| H05B 41/00 | (2006.01) |
| H02M 7/32 | (2006.01) |
| H05B 37/02 | (2006.01) |
| H02M 3/156 | (2006.01) |

(52) U.S. Cl.
CPC ............... *H05B 37/02* (2013.01); *H02M 3/156* (2013.01)
USPC .......................................... 315/186; 363/106

(58) Field of Classification Search
CPC . F21S 4/001; A47G 33/0809; A47G 33/0818; H05B 41/2855; H05B 37/03; H05B 41/2851
USPC ................... 315/186, 119, 120; 363/106, 117
See application file for complete search history.

(56) References Cited

U.S. PATENT DOCUMENTS

| 4,739,226 | A | 4/1988 | Murata |
| 6,222,385 | B1 | 4/2001 | Kang |
| 6,621,235 | B2 | 9/2003 | Chang |
| 6,636,104 | B2 | 10/2003 | Henry |
| 6,690,146 | B2 | 2/2004 | Burgyan et al. |
| 6,822,403 | B2 | 11/2004 | Horiuchi et al. |
| 6,930,679 | B2 | 8/2005 | Wu et al. |
| 6,963,175 | B2 | 11/2005 | Archenhold et al. |
| 7,116,086 | B2 | 10/2006 | Burgyan et al. |
| 7,129,679 | B2 | 10/2006 | Inaba et al. |
| 7,148,632 | B2 | 12/2006 | Berman et al. |
| 7,235,954 | B2 | 6/2007 | Murakami |

(Continued)

FOREIGN PATENT DOCUMENTS

| EP | 1 079 667 A2 | 2/2001 |
| EP | 1 079 667 A3 | 2/2001 |

(Continued)

OTHER PUBLICATIONS

PCT Search Report of the ISA for PCT/US2013/053162 dated Oct. 8, 2013.

(Continued)

*Primary Examiner* — Dylan White
(74) *Attorney, Agent, or Firm* — Daly, Crowley, Mofford & Durkee, LLP

(57) ABSTRACT

Control circuits and techniques are provided for use with DC-DC converters. The circuits and techniques may, in some implementations, be used with LED driver systems. In some embodiments control circuits are provided that rely on multiple different feedback paths to adjust a duty cycle of a DC-DC converter. In some embodiments, control circuits are provided that switch between multiple capacitors to provide as duty cycle control signal for use with a DC-DC converter.

41 Claims, 6 Drawing Sheets

(56) References Cited

U.S. PATENT DOCUMENTS

| | | | |
|---|---|---|---|
| 7,291,989 | B2 | 11/2007 | Namba et al. |
| 7,307,614 | B2 | 12/2007 | Vinn |
| 7,317,403 | B2 | 1/2008 | Grootes et al. |
| 7,375,472 | B2 * | 5/2008 | Wong et al. ............... 315/307 |
| 7,466,082 | B1 | 12/2008 | Snyder et al. |
| 7,479,743 | B2 | 1/2009 | Namba et al. |
| 7,482,765 | B2 | 1/2009 | Ito et al. |
| 7,528,551 | B2 | 5/2009 | Ball |
| 7,675,245 | B2 | 3/2010 | Szczeszynski et al. |
| 7,675,246 | B2 * | 3/2010 | Chiang et al. ............... 315/291 |
| 7,999,487 | B2 * | 8/2011 | Szczeszynski ............... 315/291 |
| 8,169,161 | B2 * | 5/2012 | Szczeszynski et al. ....... 315/308 |
| 2004/0051478 | A1 | 3/2004 | Otake et al. |
| 2004/0251854 | A1 | 12/2004 | Matsuda et al. |
| 2005/0088207 | A1 | 4/2005 | Rader et al. |
| 2005/0104542 | A1 | 5/2005 | Ito et al. |
| 2005/0110469 | A1 | 5/2005 | Inaba et al. |
| 2005/0156540 | A1 | 7/2005 | Ball |
| 2005/0243022 | A1 | 11/2005 | Negru |
| 2005/0243041 | A1 | 11/2005 | Vinn |
| 2006/0028147 | A1 | 2/2006 | Shinmen et al. |
| 2006/0114954 | A1 * | 6/2006 | Wong et al. ............... 372/38.04 |
| 2006/0125320 | A1 | 6/2006 | Namba et al. |
| 2006/0139299 | A1 | 6/2006 | Tsuchiya |
| 2006/0170287 | A1 | 8/2006 | Ito et al. |
| 2006/0250824 | A1 | 11/2006 | Wekhande et al. |
| 2007/0120506 | A1 * | 5/2007 | Grant ............... 315/312 |
| 2007/0267978 | A1 | 11/2007 | Shteynberg et al. |
| 2008/0048573 | A1 | 2/2008 | Ferentz et al. |
| 2008/0144236 | A1 * | 6/2008 | Chiang et al. ............... 361/18 |
| 2008/0164828 | A1 * | 7/2008 | Szczeszynski et al. ....... 315/300 |
| 2009/0021384 | A1 | 1/2009 | Jacubovski et al. |
| 2010/0072922 | A1 * | 3/2010 | Szczeszynski et al. ....... 315/297 |
| 2011/0026277 | A1 | 2/2011 | Strijker |
| 2011/0298384 | A1 * | 12/2011 | Tanigawa et al. ......... 315/209 R |
| 2012/0181939 | A1 | 7/2012 | Szczeszynski et al. |
| 2013/0207632 | A1 | 8/2013 | Thandi et al. |

FOREIGN PATENT DOCUMENTS

| | | |
|---|---|---|
| EP | 1 499 165 A2 | 1/2005 |
| JP | 3/196280 | 8/1991 |
| JP | 3755770 B2 | 3/2006 |
| WO | WO 00/13310 | 3/2000 |
| WO | WO 02/03087 A1 | 1/2002 |
| WO | WO 2007/043389 A1 | 4/2007 |
| WO | WO 2007/096868 A1 | 8/2007 |
| WO | WO 2008/086050 A2 | 7/2008 |
| WO | WO 2008/086050 A3 | 7/2008 |
| WO | WO 2009/064682 A2 | 5/2009 |
| WO | WO 2009/064682 A3 | 5/2009 |
| WO | WO 2013/006272 A1 | 1/2013 |

OTHER PUBLICATIONS

PCT Search Opinion of the ISA for PCT/US2013/053162 dated Oct. 8, 2013.
"Integrated 8-Channel LED Drivers with Switch-Mode Boost and SEPIC Controller;" MAXIM; MAX16807/MAX16808; #19-6055; Oct. 2006; pp. 1-21.
"Charge-Pump and Step-Up DC-DC Converter Solutions for Powering White LEDs in Series or Parallel Connections;" Dallas Semiconductor MAXIM; Apr. 23, 2002; 15 pages.
"White LED Driver IC;" NPC Nippon Precision Circuits, Inc.; SM8132A; May 2005; pp. 1-18.
"WLED Backlight Drivers with True Shutdown and OVP;" A8432 and A8433: Allegro MicroSystems, Inc. Concept Data Sheet; Jan. 25, 2005; 6 pages.
Allegro Microsystems, Inc., Data Sheet A8500: "Flexible WLED/RGB Backlight Driver for Medium Size LCDs;" Jan. 2006-2010; pp. 1-16.
Allegro Microsystems, Inc., Data Sheet A8501; "2 MHz, 4 Channel x 100 mA WLED/RGB Driver with Output Disconnect;" Jan. 2008-2010; pp. 1-24.
Allegro Microsystems, Inc., Data Sheet A8502; "Wide Input Voltage Range, High Efficiency Fault Tolerant LED Driver;" Jan. 16, 2012; pp. 1-35.
Allegro Microsystems, Inc., Data Sheet A8503; "High Efficiency 6-Channel, 2 MHz, WLED/RGB Driver for Medium Displays, with Integrated 55 V Power Switch;" Jan. 2009; pp. 1-17.
Allegro Microsystems, Inc., Data Sheet A8504, "WLED/RGB Backlight Driver for Medium Size LCDs;" Jan. 2007-2009; pp. 1-18.
Allegro Microsystems Inc., Data Sheet A8508; "Wide Input Voltage Range, High Efficiency 8-Channel Fault Tolerant LED Driver;" Jul. 9, 2012; pp. 1-28.
Bakker et al.; "A CMOS Nested-Chopper Instrumentation Amplifier with 100-nV Offset;" IEEE Journal of Solid-State Circuits; vol. 35, No. 12; Dec. 2000; pp. 1877-1883.
Burkhart et al.; "A Monolithically Integrated 128 LED-Driver and its Application;" IEEE Transactions on Consumer Electronics; vol. CE-32, No. 1; Feb. 1986; pp. 26-31.
MAXIM Data Sheet; MAX1570; "White LED Current Regulator with 1x/1.5x High-Efficiency Charge Pump;" #19-2526; Jul. 2002; pp. 1-12.
MAXIM Data Sheet; MAX1574; "180mA, 1x/2x, White LED Charge Pump in 3mm×3mm TDFN;" #19-3117; Dec. 2003; pp. 1-9.
MAXIM Data Sheet; MAX1576; "480 mA White LED 1x/1.5x/2x Charge Pump for Backlighting and Camera Flash;" #19-3326; Aug. 2005; pp. 1-14.
Raval, et al.; "DC-DC Converter Using Hysteretic Control and Associated Methods;" U.S. Appl. No. 13/591,570, filed Aug. 22, 2012.
ROHM, Data Sheet BD6066GU, Silicon Monolithic Integrated Circuit, Apr. 2005, pp. 1-6.
Szczeszynski et al.; U.S. Appl. No. 12/267,645, filed Nov. 10, 2008; Entitled: "Electronic Circuits for Driving Series Connected Light Emitting Diode Strings".
Szczeszynski; "Electronic Circuits and Techniques for Improving a Short Duty Cycle Behavior of a DC-DC Converter Driving a Load;" U.S. Appl. No. 13/177,070, filed Jul. 6, 2011.
Wilt; Linear Technology; Design Notes; "Short-Circuit Protection for Boost Regulators;" Jan. 1997, 2 pages.
Partial PCT Search Report received with Invitation to Pay Additional Fees in PCT/US2008/050026 dated Jun. 16, 2008, 5 pages.
PCT International Preliminary Report on Patentability of the ISA dated May. 27, 2010 for PCT/2008/082934; 14 pages.
PCT Search Report and Written Oipinion for the ISA of PCT/US2008/082934 mailed Dec. 15, 2009, 17 pages.
PCT Search Report and Written Opinion of the ISA for PCTUS2008/050026 dated Aug. 29, 2008, 17 pages.
Office Action dated May 28, 2014 for U.S. Appl. No. 13/591,570, filed Aug. 22, 2012.
Response filed Aug. 7, 2014 of Office Action dated May 28, 2014 for U.S. Appl. No. 13/591,570, 11 pages.
Notice of Allowance dated Oct. 9, 2014 for U.S. Appl. No. 13/591,570, filed Aug. 22, 2012.

* cited by examiner

METHOD AND APPARATUS TO CONTROL A DC-DC CONVERTER

FIELD

Subject matter disclosed herein relates generally to electronic circuits and, more particularly, to control techniques and circuits for use with DC-DC converters.

BACKGROUND

Light emitting diode (LED) driver circuits are often called upon to drive a number of series connected strings of diodes simultaneously. The strings of diodes (or "LED channels") may be operated in parallel, with a common voltage node supplying all of the strings. A DC-DC converter (e.g., a boost converter, a buck converter, etc.) may be employed by the LED driver circuit to maintain a regulated voltage level on the various LED channels during operation so that all LED channels have adequate operational power. Feedback from the LED channels may be used to control the DC-DC converter. To reduce unnecessary power consumption, it may be desirable to keep the regulated voltage level on the voltage node to a minimum or near minimum, while still providing adequate power to all channels.

Some LED driver circuits are only capable of driving LED channels that are relatively uniform. That is, the driver circuits are only capable of driving channels having the same number of LEDs and the same current levels. In addition, some driver circuits illuminate all driven LEDs using the same dimming duty cycle. These operational constraints simplify the design of the DC-DC converter associated with the LED driver circuit. Newer LED driver circuits are being proposed that will allow more complex illumination functionality. For example, some proposed designs may allow different numbers of diodes and different currents to be used in different LED channels. Some designs may also allow different dimming duty cycles to be specified for different LED channels, in addition, some proposed designs may allow different illumination phasing in different channels (i.e., the LEDs within different channels may be permitted to turn on at different times).

As will be appreciated, any increase in the functional complexity of LED driver circuits, and/or the circuitry they drive, can complicate the design of DC-DC converters and/or converter control circuitry for the drivers. Techniques and circuits are needed that are capable of providing DC-DC voltage conversion within LED driver circuits, and/or other similar circuits, that can support this increased complexity.

SUMMARY

In accordance with one aspect of the concepts, systems, circuits, and techniques described herein, an electronic circuit for use in driving a plurality of loads coupled to a common voltage node, where each load in the plurality of loads including a series-connected string of load devices, comprises: a plurality of current regulators to regulate current through corresponding ones of the plurality of loads; and control circuitry to control a DC-DC converter to generate a regulated voltage on the common voltage node, the control circuitry comprising: (a) a duty cycle control unit to control a duty cycle of the DC-DC converter, the duty cycle control unit being responsive to a duty cycle control signal at a control input thereof that is indicative of a duty cycle to be used by the duty cycle control unit; (b) at least one capacitor to carry a voltage to act as the duty cycle control signal for the duty cycle control unit; and (c) at least one error amplifier to facilitate adjustment of the voltage on the at least one capacitor based on feedback, the at least one error amplifier being configured to generate an error signal based, during first time periods, on the output voltage of the DC-DC converter and, during second time periods, on feedback from the plurality of current regulators, wherein the second time periods are different from the first time periods.

In accordance with another aspect of the concepts, systems, circuits, and techniques described herein, a method is provided for operating a duty cycle control unit to generate a switching signal for a DC-DC converter, the DC-De converter to generate an output voltage to power a plurality of light emitting diode (LED) channels coupled to a common voltage node, where each LED channel in the plurality of LED channels includes a series-connected string of LEDs and the duty cycle control unit has an input to receive a duty cycle control signal indicative of a duty cycle to be used for the DC-DC converter. More specifically, the method comprises: generating an error signal for use in adjusting a voltage level on at least one capacitor coupled to the input of the duty cycle control unit based on feedback, wherein generating the error signal includes generating the error signal based on the output voltage of the DC-DC converter during first time periods and generating the error signal based on one or more voltages across one or more current regulators associated with the plurality of LED channels during second time periods, wherein the second time periods are different from the first time periods.

In accordance with still another aspect of the concepts, systems, circuits, and techniques described herein, an electronic circuit for use in driving a plurality of loads coupled to a common voltage node, where each load in the plurality of loads including a series-connected string of load devices, comprises: control circuitry for controlling a DC-DC converter to generate a regulated voltage on the common voltage node, the control circuitry comprising: (a) a duty cycle control unit to control a duty cycle of the DC-DC converter, the duty cycle control unit being responsive to a duty cycle control signal at a control input thereof that is indicative of a duty cycle to be used by the duty cycle control unit; (b) a first capacitor to carry a first voltage to act as a duty cycle control signal for the duty cycle control unit; (c) a second capacitor to carry a second voltage to act as a duty cycle control signal for the duty cycle control unit; and (d) a switch circuit to alternately couple the first capacitor and the second capacitor to the control input of the duty cycle control unit in response to one or more control signals.

In accordance with a further aspect of the concepts, systems, circuits, and techniques deathbed herein, a method for operating a duty cycle control unit to generate a switching signal for a DC-DC converter, where the duty cycle control unit has an input to receive a duty cycle control signal indicative of a duty cycle to be used for the DC-DC converter, comprises: alternately coupling at least a first capacitor and a second capacitor to the input of the duty cycle control unit, the first and second capacitors each having corresponding voltages across them that act as duty cycle control signals for the duty cycle control unit when the corresponding capacitors are coupled to the duty cycle control unit.

In accordance with a still further aspect of the concepts, systems, circuits, and techniques described herein, a control circuit for controlling a DC-DC converter to generate a regulated voltage comprises: a duty cycle control unit to control a duty cycle of the DC-DC converter, the duty cycle control unit being responsive to a duty cycle control signal at a control input thereof that is indicative of a duty cycle to be used by the duty cycle control unit; a first capacitor to carry a first voltage to act as a duty cycle control signal for the duty cycle control unit; a second capacitor to carry a second voltage to act as a duty cycle control signal for the duty cycle control unit; and a switch circuit to alternately couple the first capacitor and the second capacitor to the control input of the duty cycle control unit in response to one or more control signals.

BRIEF DESCRIPTION OF THE DRAWINGS

The foregoing features may be more fully understood from the following description of the drawings in which.

DETAILED DESCRIPTION

Figure 1:
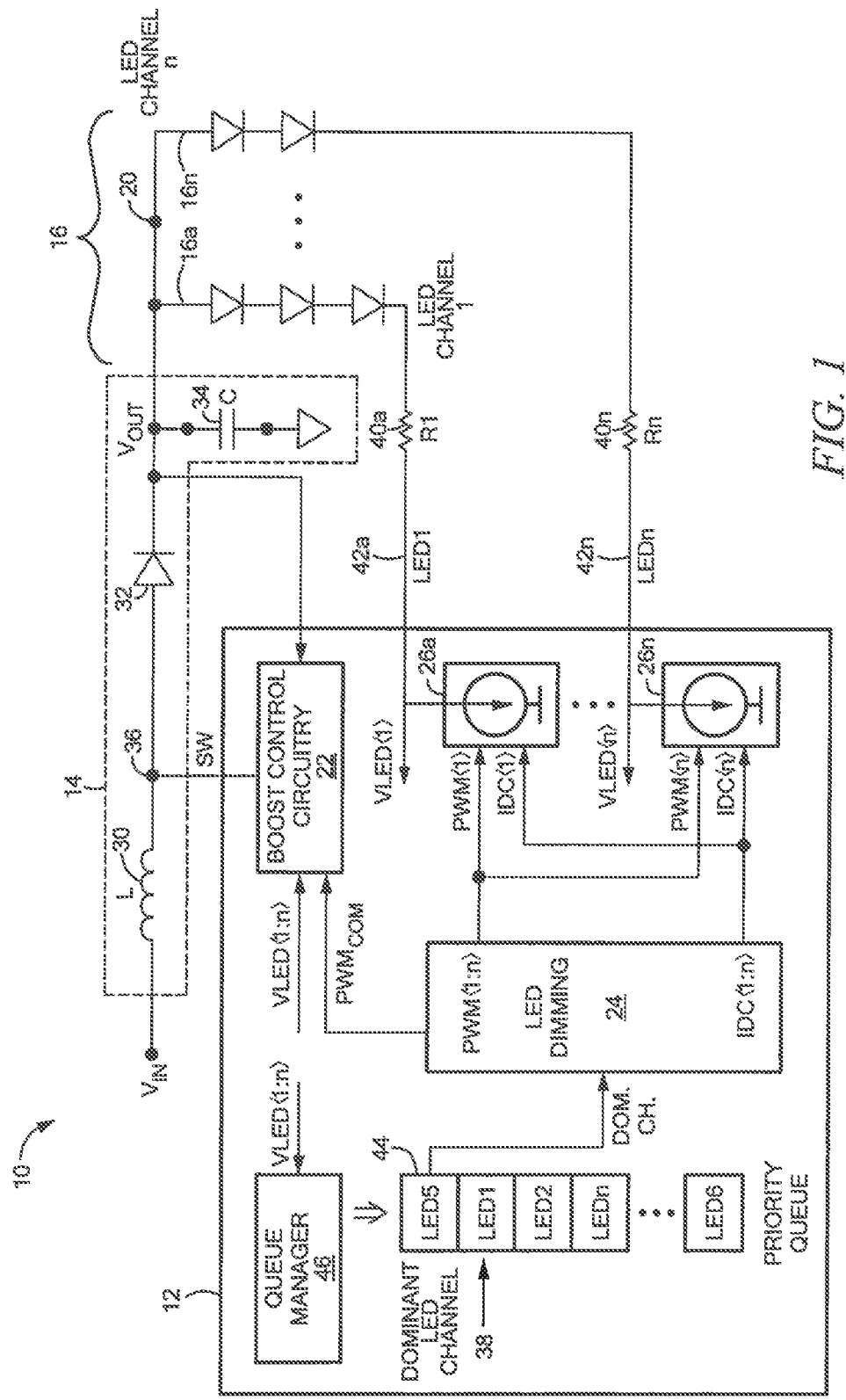
FIG. 1 is a schematic diagram illustrating an exemplary system for use in driving light emitting diodes (LEDs), or other similar load devices, in accordance with an embodiment.

FIG. 1 is a schematic diagram illustrating an exemplary system 10 for use in driving light emitting diodes (LEDs), or other similar load devices, in accordance with an embodiment. As shown, system 10 may include LED driver circuitry 12 and a boost converter 14. The system 10 may drive a plurality of LEDs 16. As shown, the plurality of LEDs 16 may be arranged in individual, series-connected strings 16a, ..., 16n that are each coupled to a common voltage node 20. These series-connected strings will be referred to herein as LED channels 16a, ..., 16n. Any number of LED channels 16a, ..., 16n may be driven by system 10 in various embodiments. In addition, in some implementations, each LED channel 16a, ..., 16n may be allowed to have a different number of LEDs. The LEDs 16 may be intended to provide any of a number of different illumination functions (e.g., backlighting thr a liquid crystal display, LED panel lighting, LED display lighting, and/or others).

In some embodiments, LED driver circuitry 12 may be implemented as an integrated circuit (IC) and boost converter 14 may be connected externally to the IC. In other embodiments, an IC may be provided that includes both LED driver circuitry 12 and boost converter 14. In still other embodiments, system 10 may be realized using discrete circuitry. As will be appreciated, any combination of integrated circuitry and discrete circuitry may be used for system 10 in various implementations. In the discussion that follows, it will be assumed that LED driver circuitry 12 is implemented as an IC.

Boost converter 14 is a DC-De voltage converter that is used to convert a direct current (DC) input voltage $V_{IN}$ to a regulated output voltage on output voltage node 20 for use in driving LEDs 16. As is well known, a boost converter is a form of switching regulator that utilizes switching techniques and energy storage elements to generate a desired output voltage. Control circuitry for boost converter 14 may be provided within LED driver circuitry 12. Although illustrated as a boost converter in FIG. 1, it should be appreciated that other types of DC-DC converters may be used in other embodiments (e.g., buck converters, boost-buck converters, etc.).

As illustrated in FIG. 1, LED driver circuitry 12 may include boost control circuitry 22 for use in controlling the operation of boost converter 14. LED driver circuitry 12 may also include LED dimming logic 24 and a number of current sinks 26a, ..., 26n. The current sinks 26a, ..., 26n are current regulators that may be use to draw a regulated amount of current through the LED channels 16a, ..., 16n during LED drive operations. In at least one embodiment, one current sink 26a, ..., 26n may be provided for each LED channel 16a, ..., 16n. LED dimming logic 24 is operative for controlling the brightness of the LEDs in the various channels 16a, ..., 16n. LED dimming logic 24 may control the brightness of an LED channel by, for example, changing the current and/or the pulse width modulation (PWM) duty cycle (or "dimming" duty cycle) of the channel. In some embodiments, LED dimming logic 24 may be capable of independently controlling both the current level and the dimming duty cycle of each of the LED channels 16a, ..., 16n by providing appropriate control signals to corresponding current sinks 26a, ..., 26n. In some embodiments, LED dimming logic 24 may also be capable of independently adjusting the illumination "turn on" time or phase of the LED channels 16a, ..., 16n (i.e., the time when a channel first lights up during a cycle).

In at least one embodiment, LED driver circuitry 12 may be user programmable. That is, LED driver circuitry 12 may allow a user to set various operational characteristics of system 10. One or more data storage locations may be provided within LIED driver circuitry 12 to store user-provided configuration information to set operational parameters such as, for example, dimming duty cycle of different LED channels, current levels of different LED channels, illumination "turn on" times of different LED channels, and/or other parameters. Any type of data storage structures may be used including, for example, flash memory, RAM memory, EEPROMs, and/or others. In some implementations, off-chip storage may be used for user configuration information. Using this approach, one or more pins, terminals, contacts, or leads may be provided on an IC for use in interfacing with external storage during driver operation. An input/output protocol may also be implemented within the IC to control the storage interface. In some implementations, a user may also be able to specify which LED channels are active (i.e., enabled) and which LED channels are inactive disabled). Default values may be used for the different parameters in the absence of user provided values.

As described above, boost converter 14 is operative for converting a DC input voltage $V_{IN}$ into a DC output voltage $V_{OUT}$ that is adequate to supply LED channels 16a, ..., 16n. In the illustrated embodiment, boost converter 14 includes an inductor 30, a diode 32, and a capacitor 34. Other boost converter architectures may alternatively be used. The operating principles of boost converters are well known in the art. To operate properly, a switching signal having appropriate characteristics must be provided to boost converter 14. Boost control circuitry 22 of LED driver circuitry 12 is operative for providing this switching signal. As will be described in greater detail, boost control circuitry 22 may draw current from switching node 36 of boost converter 14 at a controlled duty cycle to regulate the output voltage $V_{out}$ in a desired manner.

Boost converter 14 and boost control circuitry 22 are operative for providing an adequate voltage level on voltage node 20 to support operation of all active LED channels 16a, ..., 16n. To conserve energy, however, it may be desired that the voltage level on voltage node 20 be no higher (or only slightly higher) than a minimum level required to support operation. To achieve this, boost control circuitry 22 may rely, at least in part, on feedback from LED channels 16a, ..., 16n. Typically, the voltage level required for a particular LED channel will be dictated by the needs of the current sink 26a ..., 26n associated with the channel. That is, each current sink 26a, ..., 26n may require a minimal amount of voltage (e.g., an LEDs regulation voltage) to support operation for the corresponding LED channel.

In general, the voltage level on each current sink 26a, ..., 26n will be equal to the difference between the voltage on voltage node 20 and the voltage drop across the LEDs in the corresponding LED channel 16a, ..., 16n. Because each LED channel 16a, ..., 16n may have a different number of LEDs and a different DC current, different LED channels may require different minimum voltage levels for proper operation. The LED channel that requires the highest voltage level on node 20 for proper operation will be referred to herein as the "dominant" LED channel. As will be appreciated, in some implementations, the dominant LED channel may change with time. The dominant channel will often be the channel that has the most LEDs. If there are multiple channels having the "most" LEDs, than one of the channels may be selected as the dominant channel based on a selection criterion.

As shown in FIG. 1, in some implementations, optional ballast resistors 40a, ..., 40n may be used in one or more of the LED channels 16a, ..., 16n to provide balance between the voltage levels on the various current sinks 26a, ..., 26n. As described above, when no ballast resistor is present, the voltage across a current sink will typically be equal to the difference between the boost output voltage on node 20 and the voltage drop across the LEDs in the corresponding channel. Ballast resistors 40a, ..., 40n may be provided, for example, to generate an additional voltage drop in some channels to achieve similar voltages on the various current sinks 26a, ..., 26n. In this manner, some of the power dissipation that might have occurred on chip within LED driver circuitry 12 can be moved off chip to the ballast resistors 40a, ..., 40n.

Figure 2:
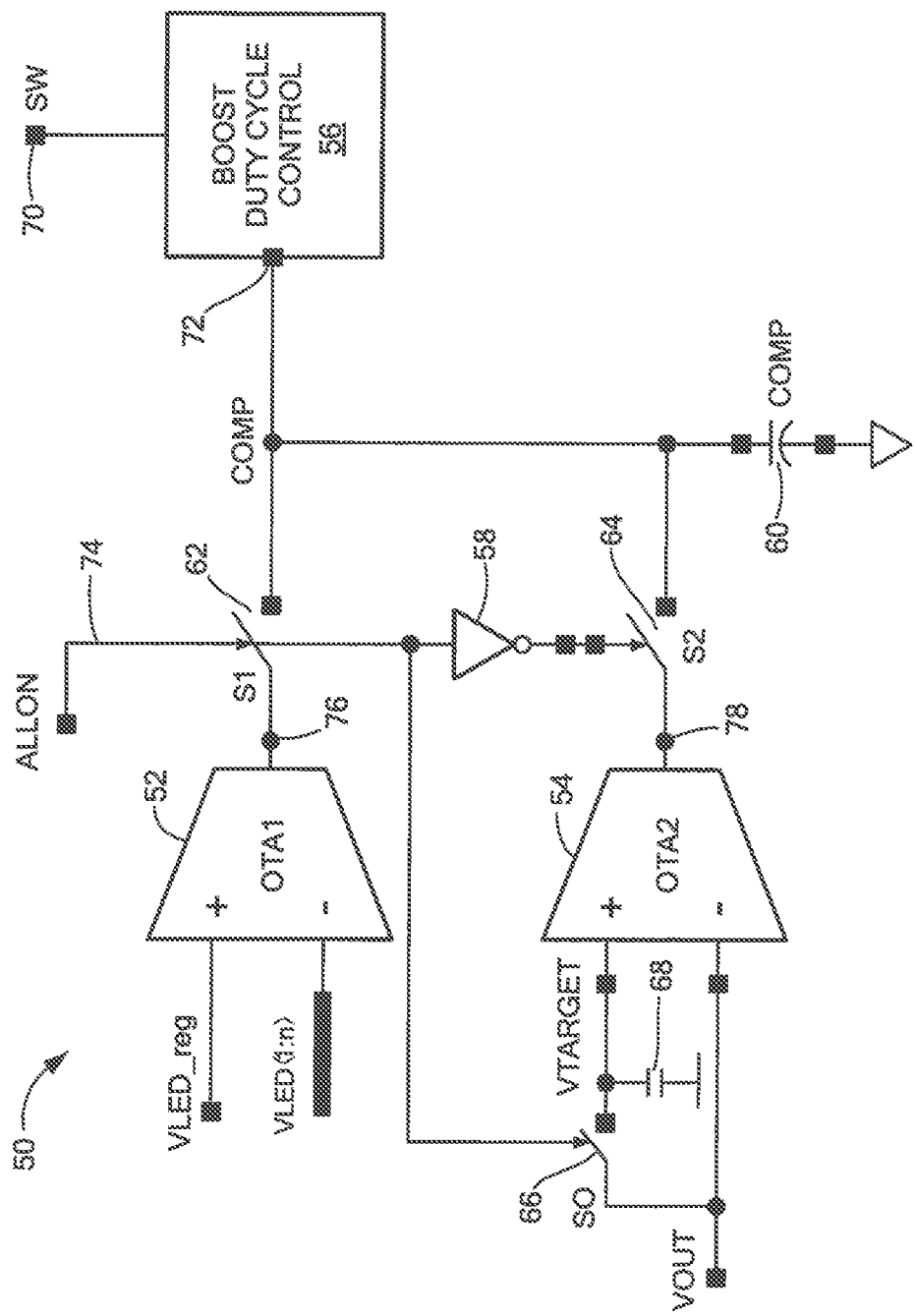
FIG. 2 is a schematic diagram illustrating exemplary boost control circuitry that may be used in an LED driver circuit in accordance with an embodiment.

FIG. 2 is a schematic diagram illustrating exemplary boost control circuitry 50 in accordance with an embodiment. As will be described in greater detail, boost control circuitry 50 of FIG. 2 is specially suited for use in LED driver systems that do not allow independent control of illumination "turn on" time (or phase) of different LED channels. That is boost control circuitry 50 is best utilized in systems that turn all enabled LED channels on at the same time (although different LED channels may use different dimming duty cycles). Boost control circuitry 50 may be used within system 10 of FIG. 1 (e.g., as boost control circuitry 22) and/or in other systems. In the discussion that follows, boost control circuitry 50 will be described in the context of system 10 of FIG. 1.

As shown in FIG. 2 boost control circuitry 50 may include: a first error amplifier 52; a second error amplifier 54; a boost duty cycle control unit 56; an inverter 58; a COMP capacitor 60; first, second, and third switches 62, 64, 66; and a sample capacitor 68. Boost duty cycle control unit 56 is operative for generating a switching signal to be applied at a switching node 70 of a corresponding boost converter (e.g., SW node 36 in boost converter 14 of FIG. 1). During system operation, boost duty cycle control unit 56 may draw current from switching node 70 at a controlled duty cycle in a manner that results in a desired DC voltage level at the boost output (e.g., voltage node 20 in FIG. 1). Boost duty cycle control unit 56 may include an input 72 to receive a duty cycle control signal to set a duty cycle of the boost converter. In the illustrated embodiment, the voltage across COMP capacitor 60 coupled to input 72 of boost duty cycle control unit 56 serves as the duty cycle control signal. Although illustrated as a single capacitor, it should be understood that multiple capacitor combinations may be used to perform this function.

First and second error amplifiers 52, 54 are operative for adjusting the voltage across COMP capacitor 60 using error signals. As described above, boost control circuitry 50 of FIG. 2 is specially suited for use in LED driver systems that do not allow independent control of illumination "on" time. Therefore, during each illumination cycle, there will be a period during which all of the LED channels are on (i.e., illuminated). First error amplifier 52 may be used to set the voltage across COMP capacitor 60 during the periods when all. LED channels are on. During periods when less than all of the LED channels in the system are on, second error amplifier 54 may be used to set the voltage across COMP capacitor 60. As described previously, in some embodiments, one or more of the LED channels within a system may be controllably disabled by the system (based on, for example, user input or some other reason). In such embodiments, phrases such as "all LED channels" and "less than all LED channels" used herein are referring to all or less than all "enabled" LED channels.

First and second switches 62, 64 are operative for controllably coupling outputs 76, 78 of first and second error amplifiers 52, 54 to COMP capacitor 60 at appropriate times. Control signal 74 (i.e., ALLON) may have a first value (e.g., logic one) when all LED channels are on and a second value (e.g., logic zero) when less than all LED channels are on (i.e., one or more LED channels are off). In the illustrated embodiment, control signal 74 is used to control first switch 62 and an inverted version of control signal 74 is used to control second switch 64. Thus, the output of first error amplifier 52 will be coupled to COMP capacitor 60 when all LED channels are on and the output of second error amplifier 54 will be coupled to COMP capacitor 60 when less than all LED channels are on. As will be appreciated, other switching schemes may be used in other embodiments (e.g., a single switch that couples either output 76 or output 78 to comp cap 60 based on control signal 74 without the need for inverter 58, etc.).

In the illustrated embodiment, first and second error amplifiers 52, 54 are trans-conductance amplifiers that each generate an output current error signal that is proportional in magnitude to a difference between two corresponding input voltages. When coupled to COMP capacitor 60, these error currents will act to adjust the voltage across the capacitor in a controlled manner. Other types of error amplifiers may be used in other embodiments. As shown in FIG. 2, first error amplifier 52 has an LED regulation voltage VLED_Reg) coupled to a non-inverting input thereof and voltage feedback signals from LED channels (i.e., VLED<1:n>) coupled to an inverting input thereof. The LED regulation voltage may represent a minimum voltage level required on a current sink (e.g., current sinks 26a, ... 26n of FIG. 1) to ensure proper operation. The voltage feedback signals may represent voltages across the current sinks of the driver circuitry (e.g., the voltages on the LED pins 42a, ..., 42n of FIG. 1).

First error amplifier 52 may generate its output error signal based on a difference between a feedback voltage and the regulation voltage. In some implementations, the feedback voltage that is used may be associated with the present dominant LED channel. In other implementations, an average or mean of the feedback signals of all channels (or some other combination) may be used. Therefore, during periods when all LED channels are on, the voltage on COMP capacitor 60 will be adjusted to ensure that the voltage level on all LED pins equals or exceeds the LED regulation voltage.

During periods when less than all of the LED channels are on, boost control circuitry 50 will simply maintain the voltage on COMP capacitor 60 at the level it had when all channels were on. This may be achieved using second error amplifier 54. As illustrated in FIG. 2, a sample capacitor 68 may be coupled to a non-inverting input of second error amplifier 54 and the present boost output voltage (VOUT) may be coupled to the inverting input. As shown, sample capacitor 68 may be controllably coupled to the boost output VOUT through switch 66, which is controlled by control signal 74. Thus, when all LED channels are on, switch 66 is closed and the output voltage of the boost converter appears across sample capacitor 68. When one or more LED channels are turned off, third switch 66 is opened and the voltage on capacitor 68 is held at its present value. Second error amplifier 54 will thereafter generate an output error signal based on a difference between the present output voltage of the boost converter and the previous value when all channels were on. The resulting error current is coupled to COMP capacitor 60 through second switch 64 to adjust the voltage thereon. The boost control circuitry 50 of FIG. 2 can be used to control the boost converter associated with LED driver circuitry even in implementations where the dimming duty cycles of the LED channels and/or the current levels of the LED channels are independently controllable. The boost control circuitry 50 can also be used in implementations where the LED channels being driven have different numbers of LEDs.

Figure 3A:
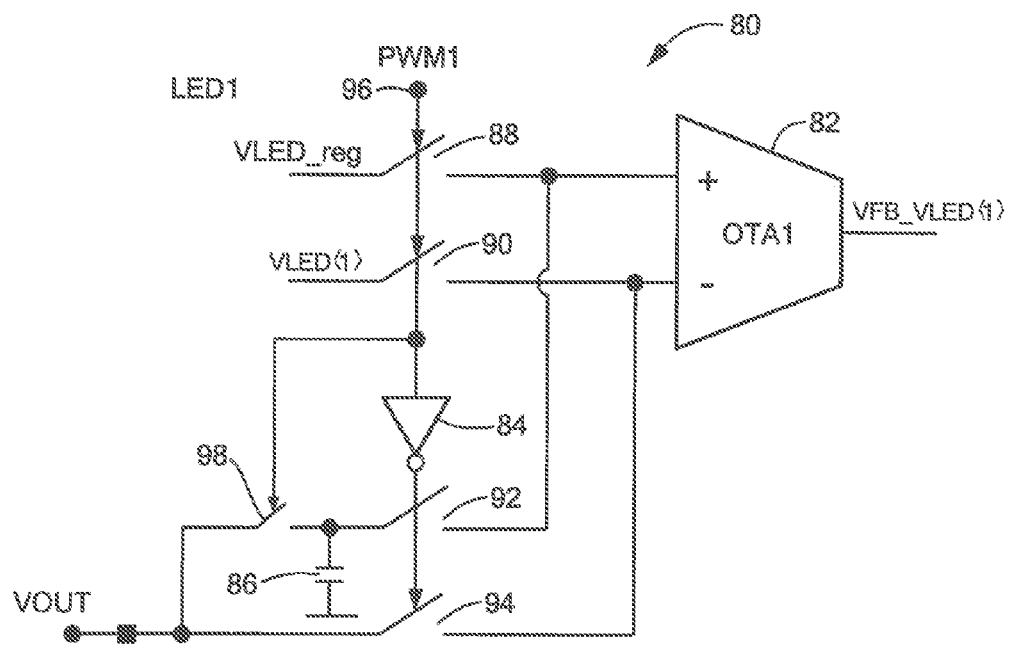
FIGS. 3A and 3B are schematic diagrams illustrating exemplary portions of a boost control circuit that may be used in an LED driver circuit that allows variable phasing of LED channels in accordance with an embodiment.
Figure 3B:
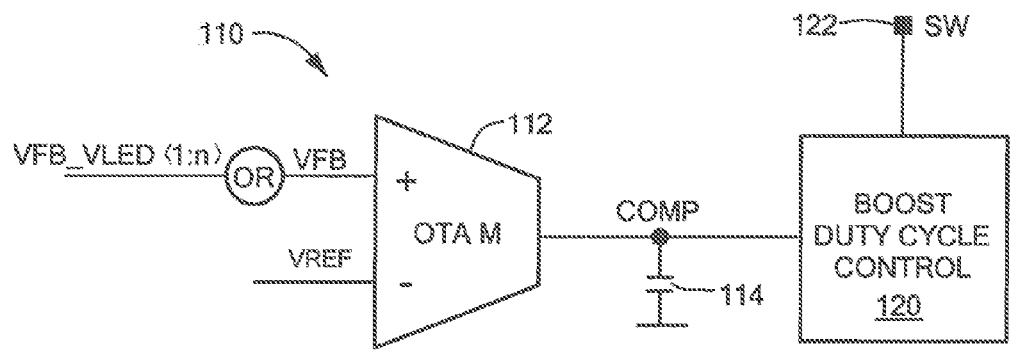

In some embodiments, the illumination turn on time or phase of the various LED channels may be independently controlled. In these embodiments, there may not always be a period during which all LED channels are concurrently illuminated and boost control circuitry 50 of FIG. 2 may be of limited effectiveness. FIGS. 3A and 3B are schematic diagrams illustrating exemplary portions of a boost control circuit that may be used when variable phasing of LED channels is permitted. FIG. 3A illustrates a control circuit 80 that may be provided for each LED channel in an LED driver system to provide a feedback signal for the channel. FIG. 3B illustrates as control circuit 110 that may be used to process the feedback signals associated with the various channels to generate a switching signal for a corresponding boost converter. The boost control circuit of FIGS. 3A and 3B may be used in system 10 of FIG. 1 (e.g., as boost control circuitry 22) and/or in other systems.

As illustrated in FIG. 3A, control circuit 80 may include: an error amplifier 82; an inverter 84; a sample capacitor 86; and first, second, third, and fourth switches 88, 90, 92, 94. As described above, in some implementations, a control circuit 80 may be provided for each LED channel in an LED driver system, in the discussion that follows, control circuitry 80 of FIG. 3A will be described in the context of a first LED channel (LED 1). Error amplifier 82 is operative for generating a feedback signal for the first LED channel based on a difference between two input voltages. In addition, the sources of the two input voltages of error amplifier 62 may vary during system operation based on, for example, a dimming duty cycle of the first LED channel. In the illustrated embodiment, switches 88, 90, 92, 94 may be used to change the inputs applied to error amplifier 82 based on, for example, a pulse width modulation (PWM) signal 96 associated with the first LED channel. When PWM signal 96 has a first value (e.g., logic one) corresponding to an "on" portion of the dimming duty cycle of the first LED channel, switches 88 and 90 may be closed and switches 92 and 94 may be open. During this time, an LED regulation voltage may be applied to a non-inverting input of error amplifier 82 and an LED pin voltage VLED<1> (or other feedback) associated with the first LED channel may be applied to the inverting input of error amplifier 82.

When PWM signal 96 has a second value (e.g., logic zero) corresponding to an "off" portion of the dimming duty cycle of the first LED channel, switches 88 and 90 may be open and switches 92 and 94 may be closed. During this time, a voltage across sample capacitor 86 may be applied to the non-inverting input of error amplifier 82 and a present output voltage of the boost converter (VOUT) may be applied to the inverting input of error amplifier 82. As shown, sample capacitor 98 may be coupled to the boost output through switch 98, which is controlled by PWM signal 96. Thus, when the first LED channel is on, switch 98 is closed and the output voltage of the boost converter appears across sample capacitor 86. When the first LED channel is turned off, switch 98 is opened and the voltage on capacitor 86 is held at its present value. Thus, when the first LED channel is tuned off, error amplifier 82 will generate an error signal based on the difference between the present boost output voltage and the prior boost output voltage when the first LED channel was on.

As illustrated in FIG. 3B, control circuit 110 may include: an error amplifier 112, a COMP capacitor 114, and a boost duty cycle control unit 120. As in the previously described embodiment, boost duty cycle control unit 120 is operative for generating a switching signal to be applied at a switching node 122 of a corresponding boost converter (e.g., SW node 36 in boost converter 14 of FIG. 1). The voltage across COMP capacitor 114 serves as a duty cycle control signal for boost duty cycle control unit 120. Error amplifier 112 generates an error signal at an output thereof that adjusts the voltage across COMP capacitor 114 based on, for example, a difference between two input voltages. In the illustrated embodiment, error amplifier 112 is a trans-conductance amplifier that generates an output current signal (although other types of amplifiers may be used in other implementations).

In at least one implementation, the voltage applied to the non-inverting input of error amplifier 112 is an average or mean of the feedback voltages of all of the LED channels (i.e., an average of the outputs of controller 80 of each channel or VFB). In some embodiments, the feedback voltages of all of the LED channels may be applied to error amplifier 112 and the averaging (or other processing) may be performed internal to amplifier 112. In at least one implementation, the control circuits 80 of all of the LED channels will be providing feedback all of the time to error amplifier 112. A reference voltage (VREF) may be applied to the inverting input of error amplifier 112. When one or more of the LED channels needs a higher voltage, the value of VFB will be greater than the reference voltage and error amplifier 112 will increase the voltage on. COMP capacitor 114. When the LED channels are being overdriven, the value of VFB will be less than the reference voltage and error amplifier 112 will reduce the voltage on COMP capacitor 114. In either case, boost duty cycle control unit 120 will change the duty cycle of the boost converter accordingly. The boost control circuit of FIGS. 3A and 3B may allow a corresponding boost converter to regulate an LED pin for minimum dimming duty cycle without generating significant ripple at the boost output.

Figure 4:
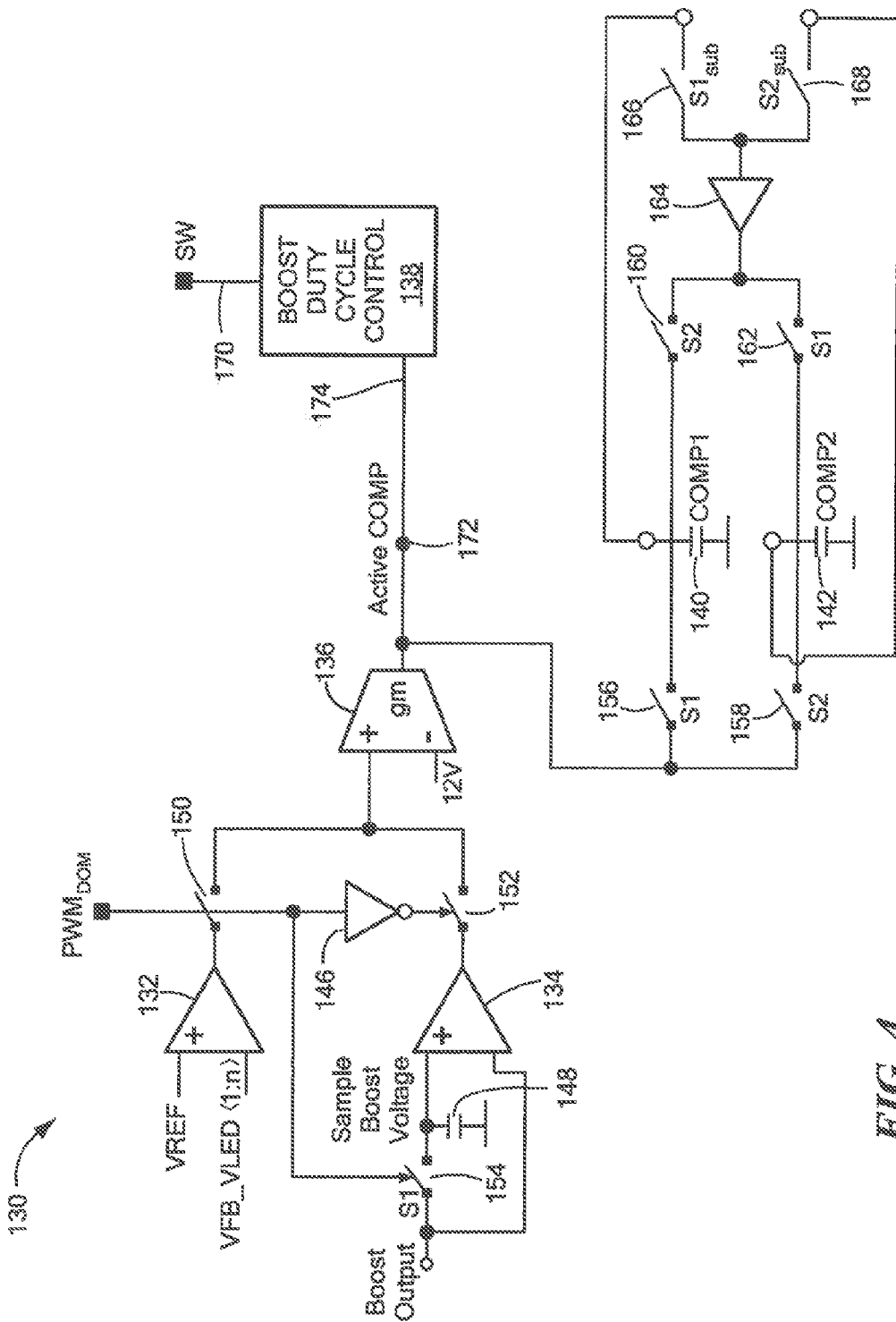
FIG. 4 is a schematic diagram illustrating an exemplary boost control circuit that uses multiple feedback paths and dual COMP capacitors in accordance with an embodiment.

FIG. 4 is a schematic diagram illustrating an exemplary boost control circuit 130 that uses multiple feedback paths and dual COMP capacitors in accordance with an embodiment. As will be described in greater detail, boost control circuit 130 of FIG. 4 is designed to maintain the output of the boost converter at a level required by a dominant LED channel, while also allowing the boost duty cycle to be rapidly changed with a sudden change in load. The boost control circuit 130 of FIG. 4 may be used in system 10 of FIG. 1 (e.g., as boost control circuitry 22) and/or in other systems.

As illustrated in FIG. 4, boost control circuit 130 may include: first, second, and third error amplifiers 132, 134, 136; a boost duty cycle control unit 138; first and second COMP capacitors 140, 142; an inverter 146; a sample capacitor 148; a number of switches 150, 152, 154, 156, 158, 160, 162, 166, 168 and a unity gain buffer 164. As in the previously described embodiments, boost duty cycle control unit 138 is operative for generating a switching signal to be applied at a switching node 170 of a corresponding boost converter. A duty cycle control signal is applied to an input 174 of boost duty cycle control unit 138 to set a duty cycle of the boost converter. Unlike the previous embodiments, however, the duty cycle control signal is not derived from a single COMP capacitor, but from two COMP capacitors 140, 142 that are alternately coupled to an active COMP node 172 during, for example, successive odd and even PWM dimming cycles. In the illustrated embodiment, switches 156, 158 are used to alternately couple the two COMP capacitors 140, 142 to active COMP node 172. The operation of all switches 150, 152, 154, 156, 158, 160, 162, 166, 168 in the illustrated embodiment will be described in detail below.

When first COMP capacitor 140 is coupled to active COMP node 172, second COMP capacitor 142 is used to sample the maximum voltage on lint COMP capacitor 140 the voltage corresponding to the "on" period of the dominant LED channel) for use during the next PWM cycle, and vice versa. When the next PWM cycle starts, the second COMP capacitor 142 is coupled to active COMP node 172 and first COMP capacitor 140 is decoupled from node 172. Because second COMP capacitor 142 sampled the highest voltage across the first COMP capacitor from the previous PWM cycle, the boost duty cycle control unit 138 can adjust almost instantaneously to the correct duty cycle for the dominant LED channel. Because of this rapid adjustment, control circuit 130 is capable of supporting very high dimming ratios (i.e., dimming duty cycles that generate a large amount of dimming, with very short "on" periods) without negatively effecting system stability.

Third error amplifier 136 is operative for generating an error signal at an output thereof to adjust the voltage across the COMP capacitor that is currently coupled to active COMP node 172. The error signal is generated based on a difference between two input signals. Based on the current state of the dominant LED channel (i.e., on or off), the non-inverting input of error amplifier 136 will be received from either first error amplifier 132 or second error amplifier 134 (each corresponding to a different feedback path from the LED channels). The inverting input of third error amplifier 136 may be coupled to a fixed reference voltage (e.g. 12 volts in the illustrated embodiment). The fixed reference voltage used with third error amplifier 136 may be the common mode voltage for the differential input, if the first and second error amplifiers 132, 134 do not have errors, then the outputs of both amplifiers may be the same as reference voltage. In this regard, the absolute do value of the fixed reference voltage can vary from implementation to implementation. In the illustrated embodiment, third error amplifier 136 comprises a trans-conductance amplifier and first and second error amplifiers 132, 134 comprise differential amplifiers, although other types of amplifiers can be used in other implementations.

When the dominant LED channel is on, switch 150 is closed (and switch 152 is open) and the output of first error amplifier 132 is coupled to non-inverting input of error amplifier 136. During this time period, the boost output voltage be regulated to the highest level required by the corresponding system. First error amplifier 132 generates an output error signal based on a voltage difference between feedback from the LED channels (e.g., one or more LED pin voltages, VFB_LED<6:1>) and a reference voltage (VREF) (e.g., the LED pin regulation voltage). In at least one embodiment, first error amplifier 132 uses the feedback voltage of the dominant LED channel to generate the output error signal. In other embodiments, other feedback signals may be used (e.g., an average or mean of all LED pin voltages, etc).

When the dominant LED channel is off switch 152 is closed (and switch 150 is open) and the output of second error amplifier 134 is coupled to the non-inverting input of error amplifier 136. Second error amplifier 134 generates an output error signal based on a voltage difference between a current value of the boost output voltage and the value of the boost output voltage during the most recent PWM on period of the dominant channel. Switch 154 will be closed during the on portion of the diming duty cycle of the dominant channel, allowing sample capacitor 148 to sample the corresponding boost output voltage. When the off period of the dimming duty cycle of the dominant channel starts, switch 154 opens and the voltage on sample capacitor 148 is held at its current value. The action of second error amplifier 134 is designed to maintain the output voltage of the boost converter at the value it had during the on portion of the dimming duty cycle of the dominant LED channel.

As described above, active COME node 172 may be alternately switched between first and second COMP capacitors 140, 142 during odd and even PWM cycles. In the illustrated embodiment, switches 156 and 158 are used to effect this result. During odd cycles, switch 156 will be closed and switch 158 will be open. During even cycles, switch 158 will be closed and switch 156 will be open. When first COMP capacitor 140 is coupled to active COMP node 172, second COMP capacitor 142 may be used to sample the maximum voltage on first COMP capacitor 140. In the illustrated embodiment, this sampling is realized using unity gain buffer 164 and switches 160, 162, 166, 168. Unity gain buffer 164 may be used to charge the capacitor that is currently sampling. During odd PWM cycles, switch 162 will be closed coupling unity gain buffer 164 to second COMP capacitor 142. During even PWM cycles, switch 160 will be closed coupling unity gain buffer 164 to first COMP capacitor 140.

As shown in FIG. 4, switch 166 is coupled between first COMP capacitor 140 and an input of unity gain buffer 164. Likewise, switch 168 is coupled between second COMP capacitor 142 and the input of unity gain buffer 164. Switch 166 is controlled by a signal S1sub that closes the switch during the "on" period of the dominant LED channel in odd PWM cycles (and opens switch 166 otherwise). When switch 166 is closed, the voltage across first COMP capacitor 140 is applied to the input of unity gain buffer 164. The input node of unity gain buffer 164 behaves as a holding node that holds the voltage level applied thereto, even after switch 166 subsequently opens. Based on the voltage at the input node, unity gain buffer 164 sets the voltage of second COMP capacitor 142 to equal the voltage that was on first COMP capacitor 140 dining the most recent "on" period of the dominant LED channel (i.e., the maximum value of the voltage on first capacitor 140 during the odd PWM cycle). Because the input node of unity gain buffer 164 behaves as a holding node, second COMP capacitor 142 does not have to charge up to the maximum voltage value of first COMP capacitor 140 within the limited time period that switch 166 is closed (which can be very short when high dimming ratios are used by the dominant channel). Instead, second COMP capacitor 142 can continue to charge even after switch 166 is closed, until it readies the maximum voltage value of first COMP capacitor 140.

In a similar fashion, switch 168 is controlled by a signal S2sub that closes the switch during the "on" period of the dominant LED channel in even PWM cycles (and opens switch 168 otherwise). When switch 168 is closed, the voltage across second COMP capacitor 142 is applied to the input of unity gain buffer 164 which then sets the voltage of first COMP capacitor 140 accordingly. Once again, the input node unity gain buffer 164 will act as a holding node so that first COMP capacitor 140 can continue to charge even after switch 168 opens. In some embodiments, the input node of unity gain buffer 164 may not act as a holding node. For example, in some implementations, dimming ratios may only be used that will allow the appropriate capacitor to be fully charged during the "on" period of the dominant LED channel.

As described previously, because first COMP capacitor 140 and second COMP capacitor 142 each sample the highest voltage of the other capacitor, when they are subsequently connected to active COMP node 172, they immediately apply the correct voltage to the node 172 for the dominant LED channel. This allows boost duty cycle control unit 138 to rapidly adjust the duty cycle of the boost converter to the necessary value. Because of this rapid adjustment, control circuit 130 is capable of supporting very high dimming ratios without negatively effecting system stability.

In the embodiments described above, various switching arrangements are shown for use in swathing components into and out of an active circuit. It should be appreciated that many alternative switching schemes may be used to achieve these switching functions and the particular switching schemes shown are merely illustrative of example arrangements. For example, as described above, switches 156 and 158 of FIG. 4 may be switched in a manner that alternately couples COMP capacitor 140 and COMP capacitor 142 to active COMP node 172. Instead of using two single pole, single throw (SPST) switches as illustrated, one single pole, double throw (SPDT) switch (or some other switching arrangement) may be used to achieve substantially the same function. Similar substitutions may be used in other circuits described herein. Any types of switches may be used in various embodiments. In some embodiments, for example, the switches may include semiconductor based switches implemented on or off chip using transistors (e.g., field effect transistors (FETS), bipolar junction transistors (BJTs), etc.) or other semiconductor switching devices. In an alternative approach, electro-mechanical switches implemented off-chip or on a secondary chip of a multi-chip module may be used. A combination of semiconductor based switches and electro-mechanical switches may also be used in some embodiments.

Figure 5:
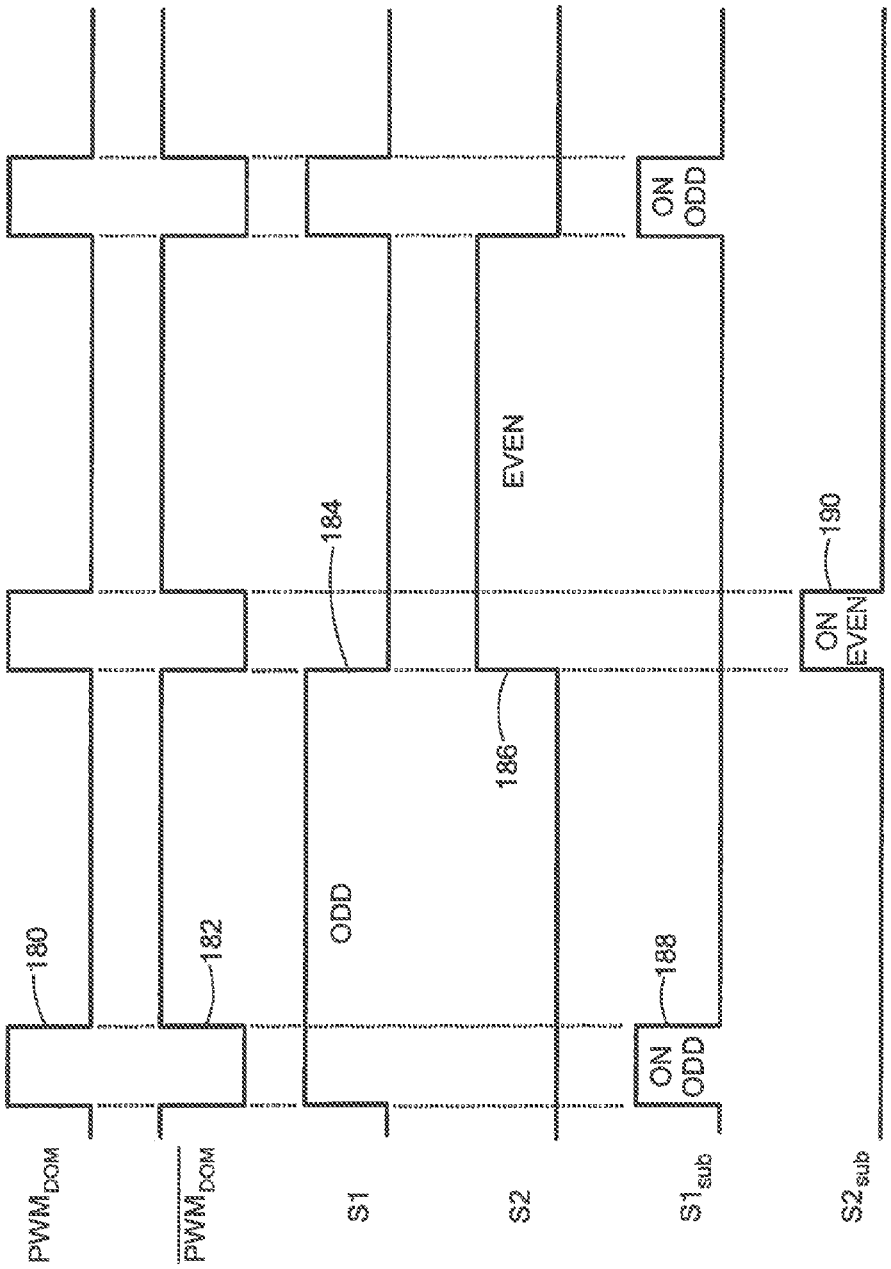
FIG. 5 is a timing diagram illustrating various exemplary control waveforms that may be used in a boost control circuit in accordance with an embodiment.

FIG. 5 is a timing diagram illustrating various exemplary waveforms that may be used as control signals to control switches in boost control circuit 130 of FIG. 4 in accordance with an embodiment. Waveform 180 ($PWM_{DDM}$) represents a possible dimming duty cycle signal for the dominant channel in an LED driver system. As shown in FIG. 4, this signal may be used to control switch 150 and switch 154. Waveform 182 ($\overline{PWM_{DOM}}$) represents an inverse of waveform 180. As shown in FIG. 4, this signal may be used to control switch 152. Waveform 184 represents control, signal S1 that may be used to identify odd PWM cycles in an LED driver system. With reference to FIG. 4, this signal may be used to control switch 156 and switch 162 in the illustrated embodiment. Waveform 186 represents control signal S2 that may be used to identify even PWM cycles in the LED driver system. With reference to FIG. 4, this signal may be used to control switch 158 and switch 160 in an embodiment.

Waveform 188 ($S1_{sub}$) represents an "on" portion of a duty cycle of the dominant LED channel of the LED driver system during the odd PWM cycles. As shown in FIG. 5, waveform 188 only includes "on" pulses during corresponding pulses in waveform 184 (but not during pulses of waveform 186). With reference to FIG. 4, this signal may be used to control switch 166 in an embodiment. Waveform 190 ($S2_{sub}$) represents an "on" portion of a duty cycle of the dominant LED channel of the LED driver system during the even PWM cycles. As shown in FIG. 5, waveform 190 only includes "on" pulses during corresponding pulses in waveform 186 (but not during pulses of waveform 184). With reference to FIG. 4, this signal may be used to control switch 168 in an embodiment.

Figure 6:
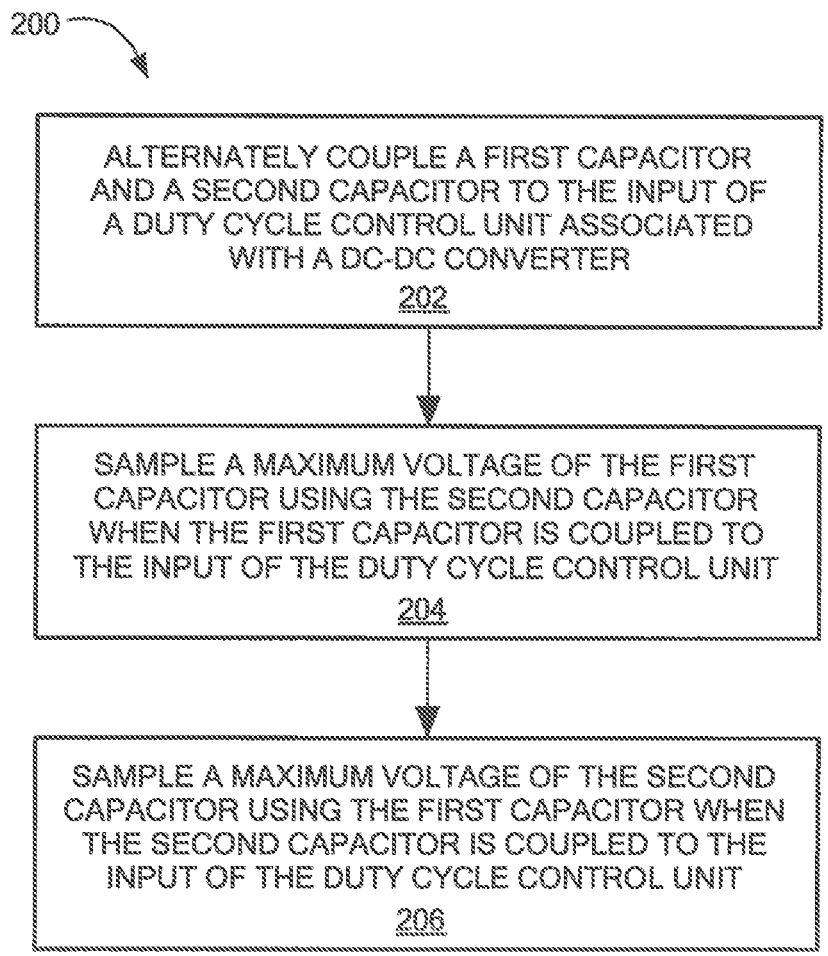
FIG. 6 is a flowchart illustrating a method for operating a DC-DC converter in accordance with an embodiment.

FIG. 6 is a flowchart illustrating a method 200 for operating a DC-DC converter in accordance with an embodiment. The method 200 may be used to control DC-DC converters associated with LED driver circuits and/or other types of circuits and systems. A duty cycle control unit may be provided to generate a switching signal for use by the DC-DC converter to set an output voltage thereof. The duty cycle control unit may have an input to receive a duty cycle control signal that is indicative of the duty cycle to be used. First and second capacitors may be provided to carry voltage levels to be used as the duty cycle control signal. The first and second capacitors may be alternately coupled to the input of the duty cycle control circuit to provide the duty cycle control signal (block 202). In some implementations, the first capacitor may be coupled to the input of the duty cycle control circuit during, for example, odd PWM dimming cycles and the second capacitor may be coupled to the input of the duty cycle control circuit during even PWM dimming cycles. The second capacitor may be used to sample the maximum voltage on the first capacitor during periods when the first capacitor is coupled to the duty cycle control unit (block 204). Likewise, the first capacitor may be used to sample the maximum voltage on the second capacitor during periods when the second capacitor is coupled to the duty cycle control unit (block 206). In this manner, when the capacitors are switched, the new capacitor will always have the correct voltage value for use with the dominant LED channel. The maximum voltage on each capacitor may be the voltage that exists on the capacitor when the dominant channel is illuminated. The voltage of the capacitor that is currently coupled to the duty cycle control circuit will be adjusted based on feedback. As described above, in some implementations, two different feedback paths may be used to adjust the voltage on the capacitor, in some embodiments, three or more capacitors may be used in block 202. In addition, as described previously, a multi-capacitor combination may be used to store a single voltage in some implementations.

As described above, in some implementations, the dominant LED channel may change with time. For example, in some implementations, a user may be permitted to disable one or more LED channels during system operation. If one of the disabled channels is the current dominant channel, a new dominant channel needs to be identified. In some implementations, it may be possible to add one or more LEDs to a channel after system deployment. This can also affect the dominant LED channel. In addition, during system operation, it may be discovered that one or more of the non-dominant LED channels is not receiving enough power. In this case, the underpowered channel may be made the dominant channel. In some embodiments, one or more components or controllers may be provided within LED driver circuitry for identifying and tracking a dominant LED channel. As used herein, the term "controller" is meant to include both digital and analog controllers and may include, for example, programmable or reconfigurable processors, embedded processors, ASICs, and/or digital or analog circuits. Controllers may be implemented either on or off chip in different embodiments.

Referring back to FIG. 1, in some implementations, a priority queue 38 may be maintained that tracks the various LED channels in order of priority. A highest priority channel 44 in the queue 38 may represent the dominant LED channel. Digital memory may be provided within LED driver circuitry 12 to store priority queue 38. Priority queue 38 may be continually updated during system operation so that the dominant LED channel is always known. Priority queue 38 may provide the updated dominant LED channel information to LED dimming logic 24 and/or boost control circuitry 22. LED dimming logic 24 may need this information to provide the appropriate dimming duty cycle information to boost control circuitry 22 for use in controlling boost converter 14.

In some implementations, a queue manager 46 may be provided for maintaining and updating priority queue 38. Queue manager 46 may, for example, include a digital or analog controller that is capable of identifying the occurrence of certain events and/or conditions that may require a change in LED channel priority. In some implementations, fir example, queue manager 46 may receive feedback from LED channels 16a, ..., 16n. This feedback may include, for example, voltage levels on the LED pins 42a, ..., 42n of the LED driver circuitry 12, or some other feedback. If queue manager 46 detects, based on the feedback, that one of the LED channels requires more voltage (e.g., the pin voltage for the channel is below a specified regulation voltage), it may move that channel to the top of priority queue 38. When the LED channel is moved, all of the other channels may be moved down in priority. Queue manager 46 may also have access to information describing which LED channels have been disabled by a user. If the highest priority LED channel in the queue 38 is disabled, queue manager 46 may move that channel to the lowest priority position in queue 38. Other LED channels may then be moved up in priority to accommodate the new lowest priority channel. In one possible approach, the LED channels may initially be listed in a default order within priority queue 38 (e.g., by channel number, etc.). The action of queue manager 46 may they rearrange and maintain the order of the channels so that the channel in the highest priority position 44 is the dominant LED channel.

In at least one embodiment, instead of a queue, one or more storage locations may be provided within LED driver circuitry 12 to record and track the identity of the current dominant LED channel. A controller may be provided to continually update the identity of the dominant channel stored in the storage location(s) based on events and conditions. Other techniques for identifying and tracking a dominant LED channel being driven by LED driver circuitry may alternatively be used.

As described previously, in some implementations, LED driver circuitry 12 of FIG. 1 may be partially or fully implemented as an IC or as a multi-chip module (MCM). In such embodiments, the various boost control circuits described herein (e.g., boost control circuitry 50 of FIG. 2, etc.) may be fully implemented on-chip or one or more elements thereof (e.g., one or more capacitors or other components) may be implemented off chip. In addition, it should be understood that the elements of the boost control circuitry will not necessarily be located in close proximity to one another within a realized circuit, which may be an integrated circuit or a multichip circuit in some embodiments. That is, in some implementations, the elements may be spread out within a larger system and coupled together using appropriate interconnect structures.

In the embodiments described above, features are described in the context of LED driver systems that utilize current sinks to draw current down through LED channels. It should be appreciated that other types of current regulation devices may be used in other embodiments. For example, in some embodiments, current sources are used that may be located near the boost output (e.g., near node 20 in FIG. 1) and which drive current downward through the LED channels, in these embodiments, feedback signals for use in boost control may be derived based on, for example, voltage drops across the various current sources. In some embodiments, these current sources may be located external to an LED driver integrated circuit (e.g., outside LED driver circuitry 12 of FIG. 1, etc.). As will be appreciated, the use of external current sources can allow higher maximum currents to be used in some implementations. In some embodiments, external current sinks may be used. For example, with reference to FIG. 1, in some implementations, the current sinks 26a-26n may be located outside the LED driver circuitry 12. In each of these different scenarios, the boost control circuits and techniques described above can still be implemented.

In the description above, techniques and circuits for providing control for a boost converter or other DC-DC converter have been discussed in the context of LED drives circuitry. It should be appreciated, however, that these techniques and circuits may also be used in other applications. For example, in some implementations, the described techniques and circuits may be used in driver circuits that drive load devices other than LEDs. The described techniques and circuits may also have application in other types of systems, components, and devices that require the generation of a regulated voltage level.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. An electronic circuit for use in driving a plurality of loads coupled to a common voltage node, each load in the plurality of loads including a series-connected string of load devices, the electronic circuit comprising:
a plurality of current regulators to regulate current through corresponding ones of the plurality of loads; and
control circuitry to control a DC-DC converter to generate a regulated voltage on the common voltage node, the control circuitry comprising:
a duty cycle control unit to control a duty cycle of the DC-DC converter, the duty cycle control unit being responsive to a duty cycle control signal at a control input thereof that is indicative of a duty cycle to be used by the duty cycle control unit;
at least one capacitor to carry a voltage to act as the duty cycle control signal for the duty cycle control unit; and
at least one error amplifier to facilitate adjustment of the voltage on the at least one capacitor based on feedback, the at least one error amplifier being configured to generate an error signal to adjust the voltage on the at least one capacitor based, during first time periods, on the output voltage of the DC-DC converter and, during second time periods, on feedback from the plurality of current regulators, wherein the second time periods are different from the first time periods.

2. The electronic circuit of claim 1, wherein:
the plurality of loads includes a plurality of light emitting diode (LED) channels, wherein each LED channel in the plurality of LED channels includes a series-connected string of LEDs.

3. The electronic circuit of claim 2, wherein:
the at least one error amplifier is configured to generate the error signal based on a difference between a present output voltage of the DC-DC converter and a past output voltage of the DC-DC converter, during the first time periods.

4. The electronic circuit of claim 3, wherein:
the at least one error amplifier is configured to generate the error signal based on a difference between a voltage across a current regulator associated with a first LED channel and an LED regulation voltage associated with the first LED channel, during the second time periods.

5. The electronic circuit of claim 4, wherein:
the first time periods include "off" portions of a dimming duty cycle of the first LED channel; and
the second time periods include "on" portions of the dimming duty cycle of the first LED channel;
wherein the past output voltage of the DC-DC converter is a voltage during a most recent "on" portion of the dimming duty cycle of the first LED channel.

6. The electronic circuit of claim 4, wherein:
the first time periods include periods when all LED channels in the plurality of LED channels are on; and
the second time periods include periods when less than all LED channels in the plurality of LED channels are on;
wherein the past output voltage of the DC-DC converter is a voltage during a most recent period when all LED channels in the plurality of LED channels were on.

7. The electronic circuit of claim 4, wherein:
the first LED channel comprises a dominant LED channel, the dominant LED channel being a channel in the plurality of LED channels that requires a highest voltage on the common voltage node, wherein the dominant LED channel can change with time.

8. The electronic circuit of claim 3, wherein:
the at least one error amplifier is configured to generate the error signal based on a difference between an average voltage across multiple current regulators of the plurality of current regulators and an LED regulation voltage during the second time periods.

9. The electronic circuit of claim 2, further comprising:
LED dimming logic coupled to the plurality of current sinks, wherein the LED dimming logic is capable of individually controlling at least some of the plurality of current regulators to set different dimming duty cycles and different current levels for corresponding LED channels.

10. The electronic circuit of claim 9, wherein:
the LED dimming logic is capable of individually controlling at least some of the plurality of current regulators to set different illumination "turn on" times for different LED channels.

11. The electronic circuit of claim 2, wherein:
the electronic circuit is implemented as an integrated circuit having at least one contact for connection to an external DC-DC converter.

12. The electronic circuit of claim 2, wherein:
the at least one capacitor includes at least one first capacitor to carry a first voltage to act as the duty cycle control signal for the duty cycle control unit;
the electronic circuit further comprising:
at least one second capacitor to carry a second voltage to act as the duty cycle control signal for the duty cycle control unit; and
a switch circuit to alternately couple the first capacitor and the second capacitor to the control input of the duty cycle control unit in response to one or more control signals.

13. The electronic circuit of claim 1, wherein:
the plurality of current regulators includes a plurality of current sinks.

14. A method for operating a duty cycle control unit to generate a switching signal for a DC-DC converter, the DC-DC converter to generate an output voltage to power a plurality of light emitting diode (LED) channels coupled to a common voltage node, each LED channel in the plurality of LED channels including a series-connected string of LEDs, the duty cycle control unit having an input to receive a duty cycle control signal indicative of a duty cycle to be used for the DC-DC converter, the method comprising:
generating an error signal for use in adjusting a voltage level on at least one capacitor coupled to the input of the duty cycle control unit based on feedback, wherein generating the error signal includes generating the error signal based on the output voltage of the DC-DC converter during first time periods and generating the error signal based on one or more voltages across one or more current regulators associated with the plurality of LED channels during second time periods, wherein the second time periods are different from the first time periods.

15. The method of claim 14, wherein:
the first time periods are "on" portions of a dimming duty cycle of a first LED channel; and
the second time periods are "off" portions of the dimming duty cycle of the first LED channel.

16. The method of claim 15, wherein:
the first LED channel is a dominant LED channel, wherein the dominant LED channel is a channel in the plurality of LED channels that requires a highest voltage on the common voltage node.

17. The method of claim 14, wherein:
the first time periods are periods during which all of the LED channels in the plurality of LED channels are on; and
the second time periods are periods during which less than all of the LED channels in the plurality of LED channels are on.

18. The method of claim 14, wherein:
generating the error signal based on one or more voltages across one or more current sinks associated with the plurality of LED channels includes generating the error signal based on a voltage across a current sink associated with a dominant LED channel, wherein the dominant LED channel is a channel in the plurality of LED channels that requires a highest voltage on the common voltage node.

19. The method of claim 14, wherein:
generating the error signal based on one or more voltages across one or more current sinks associated with the plurality of LED channels includes generating the error signal based on an average of voltages across multiple current sinks.

20. An electronic circuit for use in driving a plurality of loads coupled to a common voltage node, each load in the plurality of loads including a series-connected string of load devices, the electronic circuit comprising:
control circuitry for controlling a DC-DC converter to generate a regulated voltage on the common voltage node, the control circuitry comprising:
a duty cycle control unit to control a duty cycle of the DC-DC converter, the duty cycle control unit being responsive to a duty cycle control signal at a control input thereof that is indicative of a duty cycle to be used by the duty cycle control unit;
a first capacitor to carry a first voltage to act as a duty cycle control signal for the duty cycle control unit;
a second capacitor to carry a second voltage to act as a duty cycle control signal for the duty cycle control unit; and
a switch circuit to alternately couple the first capacitor and the second capacitor to the control input of the duty cycle control unit in response to one or more control signals.

21. The electronic circuit of claim 20, wherein:
the plurality of loads includes a plurality of light emitting diode (LED) channels, wherein each LED channel in the plurality of LED channels includes a series-connected string of LEDs.

22. The electronic circuit of claim 21, wherein:
the switch circuit is controlled to couple the first capacitor to the control input of the duty cycle control unit during odd pulse width modulation (PWM) dimming cycles and the second capacitor to the control input of the duty cycle control unit during even PWM dimming cycles.

23. The electronic circuit of claim 22, wherein:
the switch circuit is a first switch circuit; and
the control circuitry further comprises a second switch circuit to allow each of the first and second capacitors to sample a maximum voltage value of the other of the first and second capacitors when the other of the first and second capacitors is coupled to the control input of the duty cycle control unit, in response to one or more control signals.

24. The electronic circuit of claim 23, wherein:
the second switch circuit includes a unity gain buffer to set a voltage of one of the first and second capacitors when the other of the first and second capacitors is coupled to the control input of the duty cycle control unit.

25. The electronic circuit of claim 21, further comprising:
an error amplifier to adjust a voltage on a capacitor that is currently coupled to the control input of the duty cycle control unit using an output error signal, wherein the capacitor that is currently coupled to the control input of the duty cycle control unit is either the first capacitor or the second capacitor.

26. The electronic circuit of claim 25, wherein:
the error amplifier is configured to generate the output error signal based on a difference between feedback from at least one LED channel and a reference voltage, during an "on" period of a dimming duty cycle of a dominant LED channel; and
the error amplifier is configured to generate the output error signal based on a difference between a current output of the DC-DC converter and a previous output of the DC-DC converter during an "off" period of the dimming duty cycle of the dominant LED channel;
wherein the dominant LED channel is a channel that requires a highest voltage on the common voltage node.

27. The electronic circuit of claim 26, wherein:
the previous output of the DC-DC converter is an output of the DC-DC converter during a most recent "on" period of the dimming duty cycle of the dominant LED channel.

28. The electronic circuit of claim 26, wherein:
the dominant LED channel can vary with time; and
the electronic circuit further comprises a controller to track the identity of the dominant LED channel.

29. The electronic circuit of claim 25, wherein:
the error amplifier is a first error amplifier and the switch circuit is a first switch circuit; and
the control circuitry further comprises second and third error amplifiers and a second switch circuit, the second switch circuit to alternately couple the second and third error amplifiers to a first input of the first error amplifier in response to one or more control signals, where a fixed voltage level is applied to a second input of the first error amplifier.

30. The electronic circuit of claim 29, wherein:
the second switch circuit is controlled to alternately couple the second and third error amplifiers to the first input of the first error amplifier based on a dimming duty cycle of a dominant LED channel in the plurality of LED channels, wherein the dominant LED channel is a channel that requires a highest voltage on the common voltage node.

31. The electronic circuit of claim 21, further comprising:
a plurality of current sinks to draw current through corresponding ones of the plurality of LED channels; and
LED dimming logic coupled to the plurality of current sinks, wherein the LED dimming logic is capable of individually controlling at least some of the plurality of current sinks to set different dimming duty cycles and different current levels for corresponding LED channels.

32. The electronic circuit of claim 31, wherein:
the LED dimming logic is capable of individually controlling at least some of the plurality of current sinks to set different illumination turn on times for corresponding LED channels.

33. The electronic circuit of claim 21, wherein:
the electronic circuit is implemented as an integrated circuit having at least one contact for connection to an external DC-DC converter.

34. A method for operating a duty cycle control unit to generate a switching signal for a DC-DC converter, the duty cycle control unit having an input to receive a duty cycle control signal indicative of a duty cycle to be used for the DC-DC converter, the method comprising:
alternately coupling at least a first capacitor and a second capacitor to the input of the duty cycle control unit, the first and second capacitors each having corresponding voltages across them that act as duty cycle control signals for the duty cycle control unit when the corresponding capacitors are coupled to the duty cycle control unit.

35. The method of claim 34, wherein:
the output voltage of the DC-DC converter is used to power a plurality of light emitting diode (LED) channels coupled to a common voltage node, each LED channel in the plurality of LED channels including a series-connected string of LEDs, wherein the LED channels are driven in a series of pulse width modulation (PWM) dimming cycles; and
alternately coupling includes coupling the first capacitor to the input of the duty cycle control unit during odd PWM dimming cycles and coupling the second capacitor to the input of the duty cycle control unit during even PWM dimming cycles.

36. The method of claim 35, further comprising:
coupling an error signal from an error amplifier to the input of the duty cycle control unit to adjust voltages on the first and second capacitors based on feedback, wherein the error signal adjusts the voltage on the first capacitor when the first capacitor is coupled to the input of the duty cycle control unit and the error signal adjusts the voltage on the second capacitor when the second capacitor is coupled to the input of the duty cycle control unit.

37. The method of claim 35, further comprising:
sampling a maximum voltage value of the first capacitor using the second capacitor when the first capacitor is coupled to the input of the duty cycle control unit; and
sampling a maximum voltage value of the second capacitor using the first capacitor when the second capacitor is coupled to the input of the duty cycle control unit.

38. The method of claim 37, wherein:
sampling a maximum voltage value of the first capacitor includes coupling the voltage of the first capacitor to the second capacitor during an "on" portion of a dimming duty cycle of a dominant LED channel during odd PWM dimming cycles, wherein the dominant LED channel is a channel in the plurality of LED channels that requires a highest voltage on the common voltage node.

39. The method of claim 38, wherein:
coupling the voltage of the first capacitor to the second capacitor includes coupling the voltage through a unity gain buffer.

40. The method of claim 34, wherein:
alternately coupling includes alternately coupling a first capacitor, a second capacitor, and a third capacitor to the input of the duty cycle control unit.

41. A control circuit for controlling a DC-DC converter to generate a regulated voltage, the control circuit comprising:
a duty cycle control unit to control a duty cycle of the DC-DC converter, the duty cycle control unit being responsive to a duty cycle control signal at a control input thereof that is indicative of a duty cycle to be used by the duty cycle control unit;
a first capacitor to carry a first voltage to act as a duty cycle control signal for the duty cycle control unit;
a second capacitor to carry a second voltage to act as a duty cycle control signal for the duty cycle control unit; and
a switch circuit to alternately couple the first capacitor and the second capacitor to the control input of the duty cycle control unit in response to one or more control signals.

* * * * *

UNITED STATES PATENT AND TRADEMARK OFFICE
CERTIFICATE OF CORRECTION

| | | |
|---|---|---|
| PATENT NO. | : 8,994,279 B2 | Page 1 of 2 |
| APPLICATION NO. | : 13/752904 | |
| DATED | : March 31, 2015 | |
| INVENTOR(S) | : Pranav Raval et al. | |

It is certified that error appears in the above-identified patent and that said Letters Patent is hereby corrected as shown below:

On The Title Page, Item (57) Abstract line 8 delete "as duty" and replace with --a duty--.

In The Specification

Column 1, line 39 delete "channels, in" and replace with --channels. In--.

Column 2, line 12 delete "DC-De" and replace with --DC-DC--.

Column 2, line 50 delete "deathbed" and replace with --described--.

Column 3, line 50 delete "thr" and replace with --for--.

Column 3, line 63 delete "DC-De" and replace with --DC-DC--.

Column 4, line 12 delete "be use" and replace with --be used--.

Column 4, line 35 delete "LIED" and replace with --LED--.

Column 4, line 50 delete "inactive disabled)." and replace with --inactive (i.e., disabled).--.

Column 6, line 44 delete "comp cap 60" and replace with --COMP capacitor 60--.

Column 6, line 54 delete "voltage VLED_Reg)" and replace with --voltage (i.e., VLED_Reg)--.

Column 7, line 41 delete "$0" and replace with --80--.

Column 7, line 44 delete "as control" and replace with --a control--.

Column 7, line 55 delete "system, in" and replace with --system. In--.

Signed and Sealed this
Twenty-second Day of March, 2016

Michelle K. Lee
*Director of the United States Patent and Trademark Office*

CERTIFICATE OF CORRECTION (continued)

U.S. Pat. No. 8,994,279 B2

Column 7, line 60 delete "amplifier 62" and replace with --amplifier 82--.

Column 8, line 22 delete "tuned" and replace with --turned--.

Column 8, line 55 delete "on. COMP" and replace with --on COMP--.

Column 9, line 31 delete "lint COMP capacitor 140 the" and replace with --first COMP capacitor 140 (i.e., the--.

Column 9, line 56 delete "(e.g. 12" and replace with --(e.g., 1.2--.

Column 9, line 59 delete "input, if" and replace with --input. If--.

Column 9, line 62 delete "do" and replace with --DC--.

Column 10, line 4 delete "voltage be" and replace with --voltage will be--.

Column 10, line 15 delete "is off switch" and replace with --is off, switch--.

Column 10, line 23 delete "diming" and replace with --dimming--.

Column 10, line 32 delete "COME" and replace with --COMP--.

Column 10, line 63 delete "dining" and replace with --during--.

Column 11, line 5 delete "readies" and replace with --reaches--.

Column 11, line 58 delete "(PWM$_{DDM}$)" and replace with --(PWM$_{DOM}$)--.

Column 11, line 64 delete "control, signal" and replace with --control signal--.

Column 12, line 50 delete "capacitor, in" and replace with --capacitor. In--.

Column 13, line 26 delete ", fir" and replace with --, for--.

Column 13, line 45 delete "they" and replace with --then--.

Column 13, line 64 delete "off chip." and replace with --off-chip.--.

Column 14, line 12 delete "channels, in" and replace with --channels. In--.